H. MUNK.
VEHICLE WHEEL WITH ELASTIC SPOKES.
APPLICATION FILED JULY 30, 1907.
1,017,988.
Patented Feb. 20, 1912.
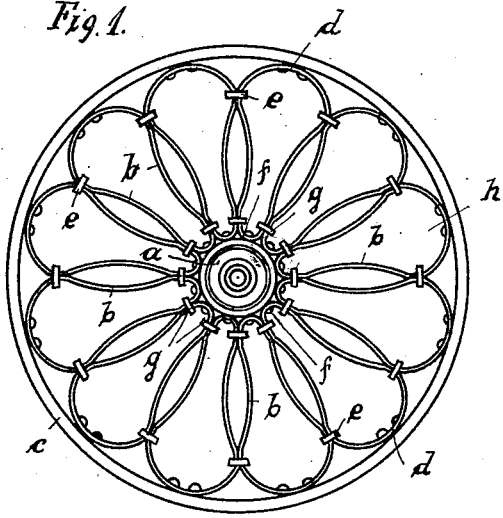
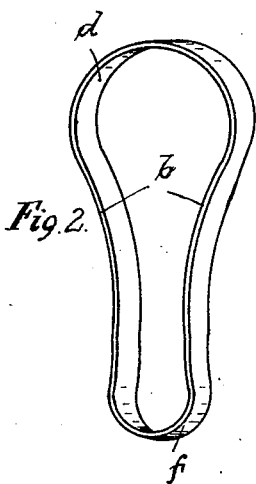
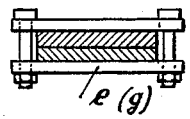
Witnesses:
Inventor:
Heinrich Munk

UNITED STATES PATENT OFFICE.

HEINRICH MUNK, OF BERLIN, GERMANY.

VEHICLE-WHEEL WITH ELASTIC SPOKES.

1,017,988.      Specification of Letters Patent.      Patented Feb. 20, 1912.

Application filed July 30, 1907. Serial No. 386,248.

*To all whom it may concern:*

Be it known that I, HEINRICH MUNK, a subject of the German Emperor, and resident of Berlin, Germany, have invented certain new and useful Improvements in Vehicle-Wheels with Elastic Spokes, of which the following is a specification.

This invention relates to improvements in vehicle wheels with elastic spokes, and its object is to provide a spoke for the same which consists of one pear-shaped piece having an outer arc and inner arc adapted to be connected to the felly and to the hub of the wheel respectively and two inwardly curved blade springs to connect said arcs, each two spokes of such construction being connected at their outer and inner arcs, whereby the spokes can freely display their elasticity without abutting against each other.

The accompanying drawing shows the improved arrangement.

Figure 1 is a side view of the improved wheel, and Fig. 2 a perspective view of a single detached spoke, while Fig. 3 shows a preferred form of clip for connecting adjacent spokes at their inner and outer arcs.

$a$ designates the hub and $c$ the felly of the wheel, between which the elastic spokes are arranged. $d$ designates the outer and $f$ the inner arc of the latter, which are fixed to felly and hub respectively by rivets or the like and connected by two inwardly curved spring members $b$ so that each spoke is formed of a pear-shaped endless blade or band spring having curved or arc-shaped inner and outer portions. $e$ and $g$ show the connecting means of any suitable construction (for instance that shown in Fig. 3) for connecting adjacent spokes at the ends of said outer and inner arcs respectively.

Having fully described my invention, what I claim and desire to secure by Letters Patent is—

An elastic wheel comprising in combination a hub and a felly, and a number of spokes between the same consisting each of one endless pear-shaped blade or band spring having curved or arc-shaped inner and outer portions and attached to said hub and felly respectively, the adjacent spokes being further connected at their outer and inner arc-shaped portions, substantially as and for the purpose set forth.

In testimony whereof I have hereunto set my hand in the presence of two subscribing witnesses.

HEINRICH MUNK.

Witnesses:
   HENRY HASPER,
   WOLDEMAR HAUPT.

---

Copies of this patent may be obtained for five cents each, by addressing the "Commissioner of Patents, Washington, D. C."